United States Patent Office 3,129,378
Patented Apr. 14, 1964

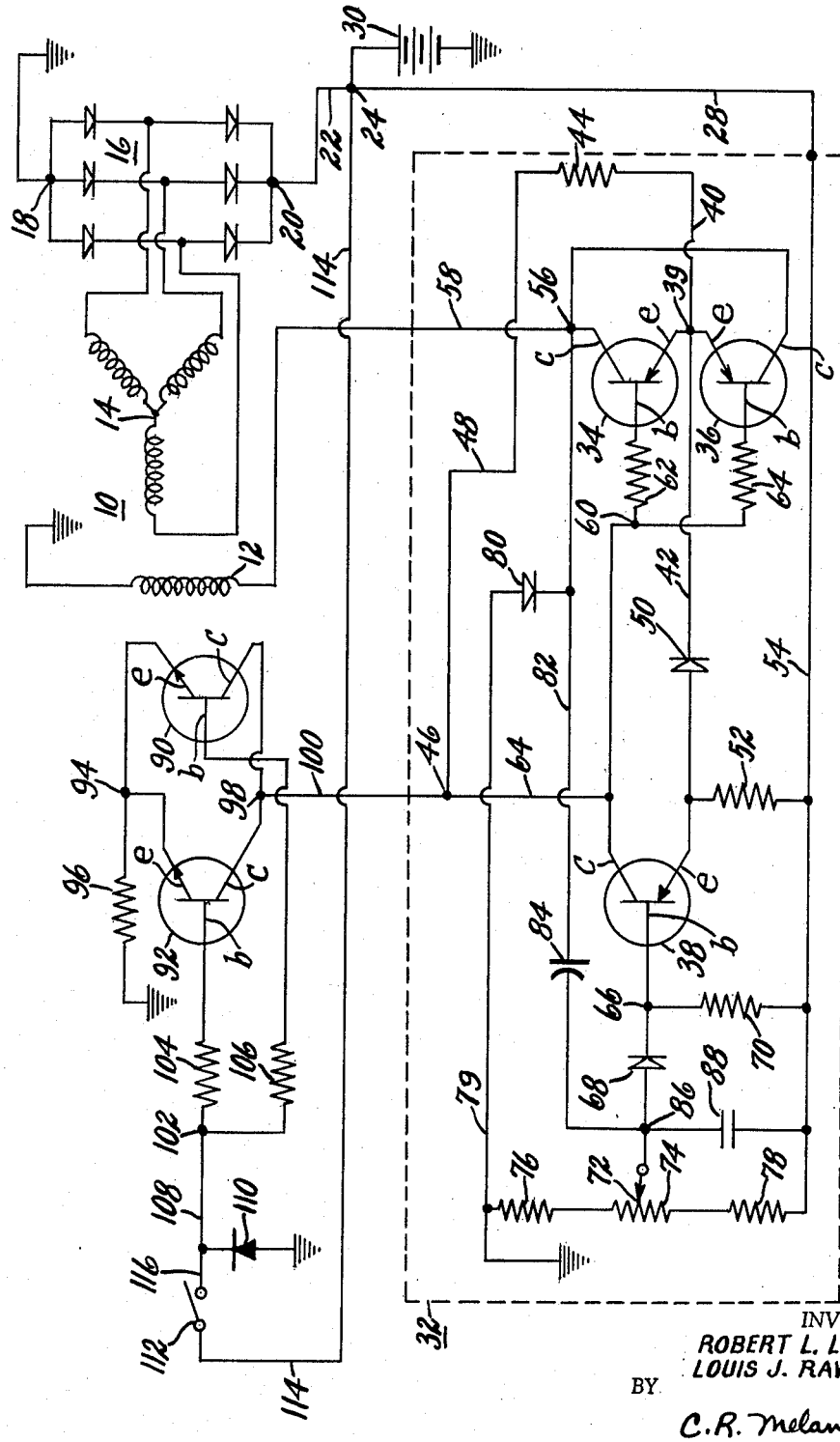

3,129,378
VEHICLE ELECTRICAL SYSTEM INCLUDING SEMICONDUCTOR REGULATOR AND SWITCH MEANS
Louis J. Raver and Robert L. Larson, Anderson, Ind., assignors to General Motors Corporation, Detroit, Mich., a corporation of Delaware
Filed Nov. 9, 1959, Ser. No. 851,755
4 Claims. (Cl. 322—28)

This invention relates to electrical generating systems for use on motor vehicles such as buses, boats, aircraft, passenger cars, trucks and the like.

In past motor vehicle battery charging systems employing an engine driven generator as the power source, it has been common practice to use a cutout relay between the generator and battery so that the field circuit of the generator was disconnected from the battery when the generator was not operating. By the use of rectifiers having low leakage current with an A.C. generator, the need for the cutout relay is eliminated since the rectifiers block flow of current through the voltage generating winding.

On some motor vehicle installations, an ignition switch or control switch is used to turn field current off when the engine is off. With installations having appreciable resistance in the ignition or control switch circuit, the circuit is unsatisfactory because the regulator of the charging system can control only voltage at its terminals which is different from the terminal voltage of the battery by the amount of the variable voltage drop in the control switch circuit. The regulator should of course control the terminal voltage of the battery. This voltage drop problem is acute especially in rear engine buses where the battery to control switch to regulator circuit is approximately twice the length of the bus.

Field relays at times have been used in some applications but are undesirable since shock loads may open the relay contacts temporarily while oxidation and burning of the contacts can cause the relay contacts to fail to close.

It is accordingly an object of this invention to provide an electrical system of the type described wherein the field circuit is completed through a static device such as a transistor that is not harmed by vibration and has no moving parts to burn or wear out. This arrangement has the added advantage of requiring a very small control switch circuit current so that no appreciable voltage drop occurs in the control or ignition switch circuit.

Another object of this invention is to provide an electrical system for a motor vehicle or the like that includes a direct current power source having a control winding, a voltage regulator for controlling the current flow through the control winding and electronic switch means for completing a circuit between the voltage regulator and one side of the D.C. power source under the control of manually operable means.

Another object of this invention is to provide an electrical system for a motor vehicle or the like that includes a direct current power source having a control winding, a voltage regulator for controlling the current flow through the control winding and one or more semi-conductor circuit elements such as transistors for controlling a circuit between the voltage regulator and one side of the D.C. power source.

Still another object of this invention is to provide an electrical system for a motor vehicle that includes an A.C. generator having a field winding, a rectifier for the generator, and a voltage regulator having semi-conductor means for controlling current flow to the field winding together with one or more transistors for controlling a circuit between the voltage regulator and one side of the D.C. power source.

With the circuits described in the foregoing objects, the battery of the vehicle electrical system is prevented from discharging through the regulator and field or control winding while the circuit between the regulator and D.C. power source is opened or substantially nonconductive. This circuit contains electronic switch means such as a transistor which is controlled by manually operable means. In this manner, the battery can be prevented from discharging through the field winding and regulator when the motor vehicle engine is not in operation.

Further objects and advantages of the present invention will be apparent from the following description, reference being had to the accompanying drawings, wherein preferred embodiments of the present invention are clearly shown.

In the drawings:

The single figure drawing is a schematic circuit diagram of a motor vehicle electrical system made in accordance with this invention.

Referring now to the drawing, an alternating current generator generally designated by reference numeral 10 has a field winding 12 and a three-phase Y-connected output winding 14. The output winding 14 is connected with a three-phase full-wave bridge rectifier designated by reference numeral 16 which has one output terminal 18 that is grounded and which has another output terminal 20 connected with the lead 22. The generator may be of any type well-known to those skilled in the art and in motor vehicle installations, the rotating part of the generator is driven from the engine of the motor vehicle.

The lead wire 22 is connected with a junction 24 which is in turn connected with lead wires 114 and 28 and to one side of a storage battery 30. The opposite side of the storage battery is grounded as shown.

A voltage regulator circuit is provided which is enclosed in dotted lines in the drawing and which is designated in its entirety by reference numeral 32. This voltage regulator circuit includes a pair of PNP transistors 34 and 36 each having an emitter electrode $e$, a base electrode $b$ and a collector electrode $c$. A third PNP transistor 38 is provided which has a base electrode $b$, a collector electrode $c$ and an emitter electrode $e$. The emitter electrodes of transistors 34 and 36 are connected to a common junction 39 which is connected with lead wires 40 and 42. The lead wire 40 is connected to one side of a resistor 44, the opposite side of the resistor being connected with junction 46 via lead wire 48. The lead wire 42 is connected to one side of a PN junction semi-conductor diode 50 which may be of the silicon type. The opposite side of diode 50 is connected with the emitter electrode $e$ of transistor 38 and is connected to one side of a resistor 52. The opposite side of resistor 52 is connected with lead wire 54 which forms a common connection for several circuit elements of the voltage regulator. It is seen that the lead wire 54 is connected with the lead wire 28 which is in turn connected to one side of the bridge rectifier 16.

The collector electrodes of transistors 34 and 36 are connected to a common junction 56 which is in turn connected with lead wire 58. The lead wire 58 is connected to one end of field 12, the other end of which is connected to ground. The base electrodes of transistors 34 and 36 are connected to a common junction 60 through resistors 62 and 64 having identical resistance values. It is seen that the junction 60 is connected with the collector electrode of transistor 38 and is also connected with a lead wire 64 which is connected with junction 46.

The base electrode of transistor 38 is connected with a junction 66 which is in turn connected to one side of a Zener diode 68. The Zener diode has the characteristic of preventing reverse current flow therethrough until a predetermined voltage is applied thereacross whereupon it conducts and operates as a constant voltage device. This type of diode is well-known to those skilled in the art. A resistor 70 is connected between junction 66 and lead wire 54. The side of the Zener diode opposite junction 66 is connected with a tap point 72 of a potentiometer designated by reference numeral 74. This potentiometer forms a part of a voltage dividing network that includes the potentiometer 74 and resistors 76 and 78. It is seen that this voltage dividing network is connected between lead wires 54 and 79 being grounded as shown.

A diode 80 is connected between lead wires 79 and 82 which provides a discharge path for the field when transistors 34 and 36 are shut off. A capacitor 84 is connected between lead wire 82 and junction 86. A second capacitor 88 is connected between junction 86 and the lead wire 54.

The circuit illustrated in the drawing includes a control circuit which may be considered part of the voltage regulator for controlling the connection of junction 46 with ground. This control circuit includes a pair of NPN transistors 90 and 92 each having an emitter electrode $e$, a collector electrode $c$ and a base electrode $b$. It is seen that the emitter electrodes are connected together at a junction 94 and are connected to ground through a resistor 96. The collector electrodes of transistors 90 and 92 are both connected with junction 98 which is in turn connected with the junction 46 of the voltage regulator by a lead wire 100. The base electrodes of transistors 90 and 92 are connected to a junction 102 through resistors 104 and 106 having identical resistance values. The junction 102 is connected with a lead wire 108 which is connected to one side of a diode 110 and to one side of a manually operable switch 112 through lead wire 116. It is seen that the opposite side of diode 110 is connected directly to ground. The opposite side of the manually operable switch 112 is connected with lead wire 114 which is in turn connected with the junction 24. The diode 110 acts to suppress transient voltages when switch 112 is opened to prevent damage to transistors 90 and 92.

If it is assumed that the switch 112 is closed, a voltage is applied to transistors 90 and 92 from the battery 30 which causes the base electrodes of the transistors to become positive with respect to the emitter electrodes. This causes the transistors 90 and 92 to become conductive between the emitter and collector electrodes and a circuit is thus established from the junction 46 and through lead wire 100 to ground. Thus, it is apparent that whenever the switch 112 is closed, a ground circuit is made for the junction 46 of voltage regulator 32. On the other hand, when the switch 112 is in an open position, the base circuit for transistors 90 and 92 is open and therefore both of these transistors become substantially nonconductive. With transistors 90 and 92 substantially nonconductive, the circuit from junction 46 of the voltage regulator to ground is open. It will, of course, be appreciated that the transistors 90 and 92 are connected in parallel and that one transistor having the proper current rating could be used if desired.

If it is assumed that the switch 112 is closed so that a circuit is completed between junction 46 and ground through transistors 90 and 92, the voltage regulator 32 will operate to maintain a substantially constant voltage between junction 24 and ground. The voltage appearing between junction 24 and ground is applied across the voltage dividing network comprised of potentiometer 74 and resistors 76 and 78. When the voltage is above the desired regulated value, a voltage is impressed across the emitter and base electrodes of transistor 38 which causes it to become conductive between emitter and collector. The conduction of transistor 38 between emitter and collector causes the transistors 34 and 36 to become substantially fully nonconductive to thus reduce to zero the voltage applied to the field winding 12 and consequently to reduce the output voltage of generator 10. It is seen that the emitter to collector current of transistors 34 and 36 is fed to the field winding 12 so that the current flow through the field winding 12 will vary in accordance with the conduction and non-conduction of transistors 34 and 36. It also will be apparent that the transistors 34 and 36 are connected in parallel and that one transistor of the proper voltage and current rating might be substituted for the two transistors.

When the regulated voltage appearing between junction 24 and ground is below the desired regulated value, the transistor 38 is caused to become substantially nonconductive between emitter and collector while the transistors 34 and 36 become fully conductive between emitter and collector. This causes the field current for field winding 12 to be increased so that the voltage output of generator 10 is likewise increased. The transistors 34 and 36 are operated either substantially fully conductive or substantially fully nonconductive to reduce heating of the transistors. If the transistors 34 and 36 were operated at their half-current point for any substantial amount of time, they would overheat and thus it is desirable to operate them either fully conductive or fully nonconductive. The theory of operation of the voltage regulator 32 is more fully described in copending application Serial No. 756,685 filed August 22, 1958, now Patent No. 3,098,964, and assigned to the assignee of this invention.

When the switch 112 is in an open position, the circuit between junction 46 and ground becomes substantially nonconductive so that current cannot flow from the base electrodes of transistors 34 and 36 to ground and cannot flow from collector electrode of trasistor 38 to ground. This will cause the transistors 34 and 36 to become nonconductive so that no current can flow through the field winding 12 to ground from the junction 24.

The switch 112 will be opened whenever the motor vehicle which drives the generator 10 is at rest, for example, when a motor vehicle such as a bus is parked and not in use. The battery with the switch 112 open cannot discharge through the field winding 12 as the transistors 34 and 36 present substantially an open circuit to this flow of current with the switch 112 opened and the transistors 90 and 92 nonconducting. When it is desired to operate the electrical system of the motor vehicle, the switch 112 is closed and this immediately completes a ground circuit for junction 46 through the transistors 90 and 92.

It is important to note that very little current flows through the conductors 108 and 116 when the switch 112 is closed as this current is only the base current for transistors 90 and 92. This becomes important when the switch 112 is located, for example, in the front of a bus and the remainder of the equipment shown in the drawing is located at the rear of the bus. These leads become very long in such a case and exhibit a considerable voltage drop when they carry high current. This voltage drop would be detrimental to the regulator action of the voltage regulator 32 since it senses the voltage at its terminals and not the terminal voltage of the battery. The voltage drop through leads 114 and 116 has no detrimental effect on the regulation characteristics of regulator 32, however, with applicants' invention since the current flow through leads 114 and 116 is very small.

It can be seen from the foregoing description of applicants' invention that the battery is prevented from discharging through the field winding 12 whenever the switch 112 is open. A certain amount of current will flow through lead 28, lead 54 and through the voltage dividing network 74, 76 and 78 to ground regardless of whether the switch 112 is opened or closed. The resistance value of potentiometer 74 and resistors 76 and 78 is of such a value however so that this discharge current is of no consequence. It will of course be appreciated that the diodes of bridge rectifier 16 prevent the battery from discharging to ground.

It should be noted that even relatively large voltage variations in the switch line will not affect voltage regulation since resistors 104, 106 and 96 are chosen at such values that transistors 90 and 92 are turned "full on" even if the voltage at junction 102 is, for example, only one-half or three-fourths of normal system voltage.

While the embodiment of the present invention as herein disclosed, constitutes a preferred form, it is to be understood that other forms might be adopted.

What is claimed is as follows:

1. In combination, a direct current power source having a control winding, voltage regulating means including a transistor having an emitter-collector circuit connected with said power source and with said control winding for controlling the current flow through said control winding as a function of output voltage of said power source, a base circuit for connecting the base electrode of said transistor to one side of said power source, said base circuit including the emitter-collector circuit of a second transistor, and manually operable means for controlling the conduction of said second transistor.

2. In combination, an A.C. generator having an output winding and a field winding, a direct current output circuit, rectifier means connected between said output winding and said output circuit for supplying said output circuit with direct current, voltage regulating means including at least one transistor connected in circuit with said output circuit and said field winding for controlling the current flow through said field winding as a function of the output voltage of said rectifier means, a base circuit for said transistor, including the emitter-collector circuit of a second transistor, and manually operable means for controlling the conduction of said second transistor.

3. In combination, a direct current power source having output terminals and a control winding, transistor regulating means having a pair of terminals connected across said output terminals, said regulating means having a third terminal connected with said control winding and a fourth terminal, semiconductor switch means connected between said fourth terminal and one of said output terminals, and manually operable means for controlling conduction of said semiconductor switch means.

4. In a battery charging system, the combination comprising, a generator having a field winding, rectifier means connected between said generator and battery, a circuit for connecting said field winding to one side of said rectifier means including a first semiconductor having a pair of current carrying terminals in said circuit and a control terminal, and second semiconductor means performing no regulating function controlled by manually operable means connected with the control terminal of said first semiconductor for controlling the conduction of said first semiconductor.

References Cited in the file of this patent

UNITED STATES PATENTS

| | | |
|---|---|---|
| 2,639,391 | Stone | May 19, 1953 |
| 2,640,163 | Short et al. | May 26, 1953 |
| 2,722,649 | Immel et al. | Nov. 1, 1955 |
| 2,809,301 | Short | Oct. 8, 1957 |

FOREIGN PATENTS

| | | |
|---|---|---|
| 1,193,182 | France | Apr. 27, 1959 |